(12) United States Patent
Righi et al.

(10) Patent No.: US 8,078,856 B1
(45) Date of Patent: Dec. 13, 2011

(54) POWER-ON SELF-TEST DATA NOTIFICATION

(75) Inventors: Stefano Righi, Lawrenceville, GA (US); Ashraf Javeed, Karnataka (IN)

(73) Assignee: American Megatrends, Inc., Norcross, GA (US)

( * ) Notice: Subject to any disclaimer, the term of this patent is extended or adjusted under 35 U.S.C. 154(b) by 938 days.

(21) Appl. No.: 11/952,618

(22) Filed: Dec. 7, 2007

(51) Int. Cl.
  *G06F 9/00* (2006.01)
(52) U.S. Cl. .................................................. 713/1; 713/2
(58) Field of Classification Search ................ 713/1, 2
  See application file for complete search history.

(56) References Cited

U.S. PATENT DOCUMENTS

| | | | |
|---|---|---|---|
| 6,393,586 B1 * | 5/2002 | Sloan et al. | 714/25 |
| 6,910,157 B1 * | 6/2005 | Park et al. | 714/36 |
| 7,243,222 B2 * | 7/2007 | Rothman et al. | 713/1 |
| 7,565,579 B2 * | 7/2009 | Shi | 714/38 |
| 2002/0178242 A1 * | 11/2002 | Eda | 709/222 |
| 2005/0289333 A1 * | 12/2005 | Rothman et al. | 713/1 |
| 2006/0236087 A1 * | 10/2006 | Ha | 713/2 |
| 2007/0106824 A1 * | 5/2007 | Hikita | 710/29 |
| 2008/0201498 A1 * | 8/2008 | Ohkubo | 710/33 |

OTHER PUBLICATIONS

"Setting Up a USB 2.0 Debug Cable Connection" Microsoft MSDN library [online] [retrieved on Jun. 7, 2011][retrieved from: http://msdn.microsoft.com/en-us/library/ff556869(v=vs.85).aspx] pp. 1-3.

* cited by examiner

*Primary Examiner* — Vincent T Tran
*Assistant Examiner* — Zahid Choudhury
(74) *Attorney, Agent, or Firm* — Hope Baldauff Hartman, LLC (57) ABSTRACT

Systems, methods, and computer-readable media provide for notification of power-on self-test (POST) data using an output device that is externally connected to a target computer system undergoing the POST via a data cable. Embodiments include a data transport module having an interface for receiving POST data from a debug module within the firmware of the target computer system and a notification application executed on the output device. The POST data transport module receives POST data and writes it to one or more hardware registers associated with an external port of the target computer system. The POST data is transferred to the data cable from the hardware registers and is received from the cable by the notification application of the output device. The notification application generates a notification corresponding to the received POST data and displays the notification on a display of the output device.

17 Claims, 4 Drawing Sheets

POWER-ON SELF-TEST DATA NOTIFICATION

BACKGROUND

When a computer system is powered on, a basic input/output system (BIOS) of the computer system will initiate a power-on self-test (POST). A number of activities take place during a POST, including but not limited to the verification of computer code integrity, discovery and initialization of system buses and memory, and the initialization of various ports and peripheral devices. A typical method for debugging a BIOS is through the use of POST error codes. POST error codes are commonly output to a peripheral component interconnect (PCI) card or other POST card that is installed within the computer system at a fixed input/output (I/O) address, port 80h, on the PCI system bus. The POST card is capable of displaying a hexadecimal value representing the POST error code. A technician can then use the displayed hexadecimal value to correct the error. However, the use of a POST card requires that the computer system being tested have an available PCI expansion slot or other slot corresponding to the type of POST card used. Additionally, POST cards cannot be used in situations involving closed computer system cases.

SUMMARY

Systems, methods, and computer-readable media are provided herein for providing POST notifications associated with a target computer system to an externally connected output device. According to one implementation described herein, a method for providing POST data includes generating the POST data that corresponds with a POST event and writing the data to one or more hardware registers. The hardware registers are associated with a port of the target computer system that is configured for connection to an external output device using a data cable. A transfer instruction is sent to a port controller that is associated with the target system port to transfer the POST data within the hardware registers to the data cable. According to one implementation, the target system port is a USB 2.0 debug port and the data cable is a USB debug cable.

According to another implementation of the disclosure presented herein, POST data is received at an external output device from a data cable that connects the external output device to the computer system executing the POST. A notification that represents the POST data is generated for a technician or other user and is displayed on a display of the external output device. According to one embodiment, the external output device is a cellular telephone.

Yet another implementation includes a system for providing POST data. The system includes a POST data transport module having an interface for a debug module within the firmware of a target computer system undergoing the POST, and a POST data notification application to be executed on an external output device connected to the target computer system via a data cable. The POST data transport module is capable of receiving the POST data corresponding to a POST event and writing the POST data to one or more hardware registers associated with a target system port. The POST data notification application is capable of receiving the POST data from the data cable connecting the external output device to the target system port of the target computer system. The POST data notification application is further capable of generating a notification corresponding to the received POST data and displaying the notification on a display of the external output device.

The above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following detailed description is directed to systems, methods, and computer-readable media for accessing POST data associated with a target computer system with an output device that is externally connected to the target computer system. While the subject matter described herein is presented in the general context of program modules that execute in conjunction with the execution of an operating system and application programs on a computer system, those skilled in the art will recognize that other implementations may be performed in combination with other types of program modules.

Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

The subject matter described herein may be practiced in a distributed computing environment where tasks are performed by remote processing devices that are linked through a communications network and wherein program modules may be located in both local and remote memory storage devices. It should be appreciated, however, that the implementations described herein may also be utilized in conjunction with stand-alone computer systems and other types of computing devices. It should also be appreciated that the embodiments presented herein may be utilized with any type of local area network (LAN) or wide area network (WAN).

In the following detailed description, references are made to the accompanying drawings that form a part hereof, and which are shown by way of illustration specific embodiments or examples. As discussed above, a technician is typically limited to receiving POST data through the use of POST cards installed within a PCI expansion slot of a target computer system. The disclosure presented herein allows a technician to receive POST data through an external connection of a cellular telephone or other output device to the target computer system undergoing the POST. Doing so allows for the receipt of POST data when all of the PCI slots of the target computer system are occupied, and as will be described in greater detail below, allows the technician to take further action with the POST data according to the capabilities of the cellular telephone or other output device.

Figure 1:
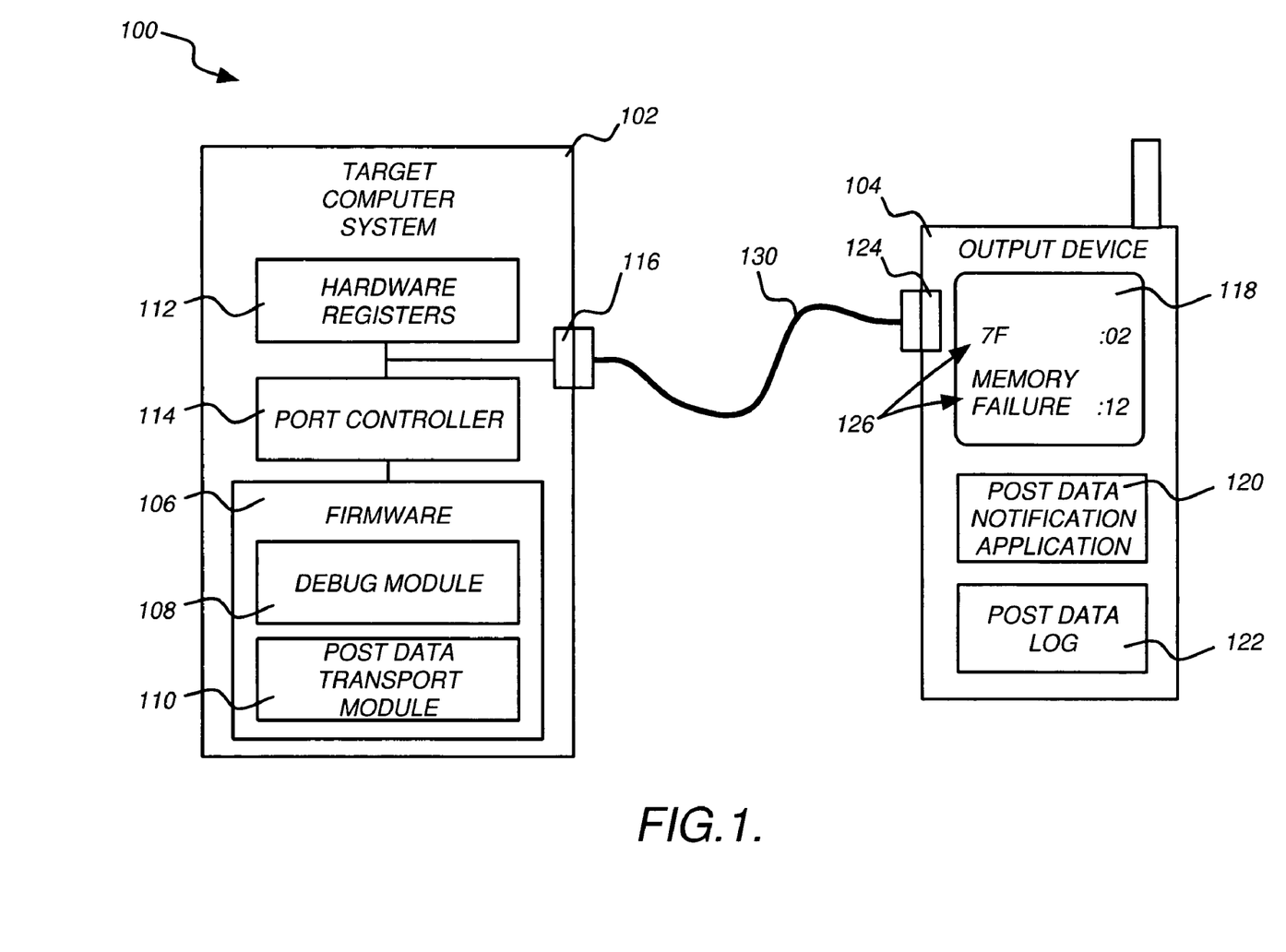
FIG. 1 is a block diagram showing an illustrative operating environment for the processes and computer systems described herein, including several of the hardware and software components utilized by the described computer systems described according to embodiments presented herein.

Referring now to the drawings, in which like numerals represent like elements through the several figures, aspects of a computing system and methodology for accessing POST data using an output device will be described.—FIG. 1 shows a POST data notification system 100. The POST data notification system 100 includes a target computer system 102 connected to an output device 104 via a data cable 130. The target computer system 102 includes firmware 106, which contains any number of drivers, or modules, that support the target computer system 102 and associated hardware. The firmware 106 includes the BIOS that initiates a POST during a power-up sequence or reset of the target computer system 102.

A debug module 108 within the firmware 106 contains programming code that is operative to monitor the POST and to provide POST data at debug checkpoints of the POST process. Numerous debug checkpoints are written into the firmware 106 to correspond with various operations of the POST. For example, when initialization of the memory of the target computer system 102 begins, a debug checkpoint corresponding to the memory initialization triggers the debug module 108 to provide POST data to a data transport module 110.

In the case of traditional POST error notifications, the data transport module 110 provides the POST data as a hexadecimal value to port 80h for a POST card to display. If the POST fails, then a technician reading the hexadecimal value on the POST card will know that the failure corresponds to the portion of the POST represented by the hexadecimal value. Throughout this disclosure, "POST data" and "POST error code" may be used synonymously. However, it should be understood that the POST data may include any type of number, code, or other type of data that represents any type of information that may be detected during a POST event and interpreted by the debug module 108. For example, the POST data may represent a failure of a POST portion or element, a successful completion of a POST portion or element, POST progress details, or the status of any components associated with the POST.

Rather than providing POST data to a fixed I/O address, such as port 80h, on the PCI system bus, according to embodiments of the disclosure presented herein, the data transport module 110 provides POST data to hardware registers 112 with instructions to the port controller 114 to provide the data to the data cable 130 through a target system port 116. The hardware registers 112 may be thought of as a "virtual port 80h." Although the scope of the present disclosure allows for the target system port 116 to be of a type commonly used for the connection of peripherals, such as a universal serial bus (USB) 1.0 or 2.0 port, the target system port 116 is preferably a USB 2.0 debug port.

With a typical USB port, such as a USB 1.0 or 2.0 port, the corresponding USB controller makes extensive usage of target computer system memory to control the USB bus in order to keep the descriptors of the bus transactions. This extensive memory usage applies to other commonly used types of ports as well. Consequently, if POST data were to be routed to a typical USB port for POST data notification purposes using an external output device, then the port would not be available until after the target computer system memory has been initialized. Because POST error codes and other data often need to be presented to a technician prior to the time in which the target computer system memory is available, the use of a typical USB port or other port requiring target computer system memory is not ideal. As an example, in a situation in which the target computer system memory fails during the POST, notification via a typical USB port would not be possible since the USB controller utilizes the target computer system memory in transmitting data via the USB port.

However, a USB 2.0 debug port utilizes hardware registers 112 that contain all of the descriptors necessary to control the transaction without the usage of any target computer system memory. It should be understood that the target system port 116 may alternatively be any other type of data port having associated hardware registers 112 for receiving POST data prior to the initialization of the main target computer system memory. The characteristics of the hardware registers 112 are such that the amount of information that is capable of being stored within the hardware registers 112 may be limited. However, the amount of space required by the POST data is minimal, allowing for the POST data to be stored within the hardware registers 112. For example, according to one implementation, the hardware registers 112 allow for eight bytes of data storage and the POST data transmitted at any given time typically includes two bytes of data or less, but may be any quantity of data less than the maximum allowed by the hardware registers 112.

As shown in FIG. 1, the output device 104 is connected to the target computer system 102 via the data cable 130. One end of the data cable 130 is connected to the target system port 116 of the target computer system 102 and the other end of the data cable 130 is connected to a communications port 124 of the output device 104. The communications port 124 may be a USB interface or any other type of data port capable of receiving data from the data cable 130. According to one embodiment in which the target system port 116 includes a USB 2.0 debug port, the data cable 130 is a USB debug cable capable of interfacing with the USB 2.0 debug port of the target computer system and transmitting POST data between the target computer system 102 and the output device 104. The USB debug cable may have an associated device identifier number such that the output device 104 recognizes the data cable 130 as a device and receives POST data from the data cable 130.

According to various embodiments, the output device 104 includes a display 118, a POST data notification application 120, and a POST data log 122. It should be appreciated that the output device 104 may additionally contain any components commonly contained within a smart telephone, or other communications or computing device, that allow the output device 104 to receive, store, interpret, display, and transmit data. As mentioned above, according to one implementation provided herein, the output device 104 is a cellular telephone. The POST data notification application 120 contains programming code that receives POST data from the data cable 130 and subsequently performs one or more actions according to pre-programmed instructions.

According to one embodiment, the POST data notification application 120 displays a notification 126 associated with the POST data on the display 118 of the output device 104. The notification 126 may include the actual POST data originated by the debug module 108, such as a hexadecimal value corresponding to a POST checkpoint. A time stamp may be optionally included to provide the technician with a time within the BIOS execution that a failure occurred or that a checkpoint was successfully reached. Alternatively, the POST data notification application 120 may utilize the received POST data to look up a notification message to display for the technician. In this embodiment, the output device 104, or an external storage device communicatively connected to the output device 104 via a wired or wireless network, may store a table of POST data and associated notification messages for referencing by the POST data notification application 120 when POST data is received. It should be appreciated that the notification 126 may utilize any type of media to alert the technician, including text, audio, video, images, and any other type of multimedia or combination thereof.

In addition to displaying received POST data or information associated with received POST data, the POST data notification application 120 may store the received POST data or associated information in the POST data log 122. Logging POST data can be helpful to a technician when troubleshooting future problems. As an example, the POST data notification application 120 may be programmed to store a code associated with each driver as each driver loads during BIOS execution. A time stamp corresponding to the time during the BIOS execution in which each driver loads may be stored with each code. In this manner, the technician may later refer to the POST data log 122 to view detailed information about the BIOS execution. According to one implementation, the POST data log 122 may be transmitted to a third party via a wired or wireless network using any type of communications media. For example, the technician may choose to send the contents of the POST data log 122 to a supervisor or other technician via electronic mail or other messaging application.

Figure 2:
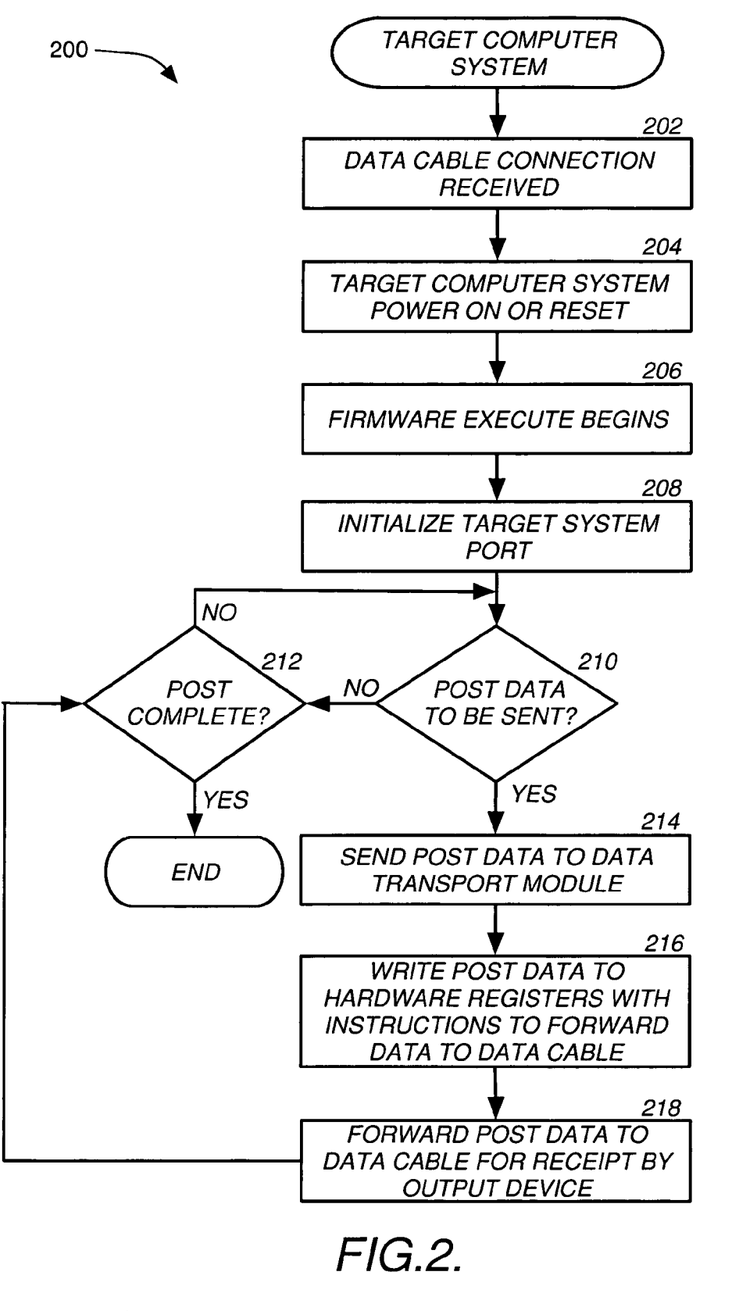
FIG. 2 is a flow diagram showing aspects of the operation of a target computer system according to embodiments described herein.

Turning now to FIG. 2, an illustrative routine 200 showing aspects of the operation of the target computer system 102 for providing POST data to the output device 104 according to various embodiments presented herein will be described. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed, and in any order, than those shown and described herein.

The routine 200 begins at operation 202, where the data cable 130 is connected to the target system port 116 of the target computer system 102. According to one embodiment, the data cable 130 is a USB debug cable and the target system port 116 is a USB 2.0 debug port. From operation 202, the routine 200 continues to operation 204, where the target computer system 102 is powered on or reset. The routine 200 continues from operation 204 to operation 206, where execution of the firmware 106 begins as a result of the power-on or reset action. The debug module 108 is executed from a boot block portion of the firmware 106, enabling the debug module 108 to forward POST data to the hardware registers 112 associated with the target system port 116.

The routine 200 continues from operation 206 to operation 208, where the firmware 106 initializes the target system port 116 and associated components. According to one implementation, this initialization occurs early in the BIOS execution since errors or other POST data cannot be displayed on the output device 104 until the target system port 116 and associated hardware registers 112 and port controller 114 are available to receive POST data from the data transport module 110 and transmit the POST data to the data cable 130. From operation 208, the routine 200 continues to operation 210, where the debug module 108 determines whether POST data is to be sent to the output device 104 for display. This determination may be made according to whether an error in the POST has occurred or based on whether a checkpoint within the POST has been reached.

If the debug module 108 determines that POST data should be sent to the output device 104 for display, then the routine proceeds to operation 214 and continues as described below. However, if at operation 210, the debug module 108 determines that POST data should not be sent to the output device 104 for display, then the routine 200 proceeds to operation 212, where a determination is made as to whether the POST has completed. If the POST has completed, then the routine 200 ends. However, if the POST has not completed, then the routine 200 returns to operation 210 and continues as described above.

Returning to operation 210, if the debug module 108 determines that POST data should be sent to the output device 104 for display, then the routine proceeds to operation 214, where the debug module sends the applicable POST data and forwarding instructions to the data transport module 110. From operation 214, the routine 200 continues to operation 216, where the data transport module writes the POST data to the hardware registers 112 and instructs the port controller 114 to transmit the POST data to the data cable 130 via the target system port 116. The routine 200 continues from operation 216 to operation 218, where the port controller 114 forwards the POST data from the hardware registers 112 to the data cable 130 for receipt and display by the output device 104. From operation 218, the routine 200 returns to operation 212 and proceeds as described above.

Figure 3:
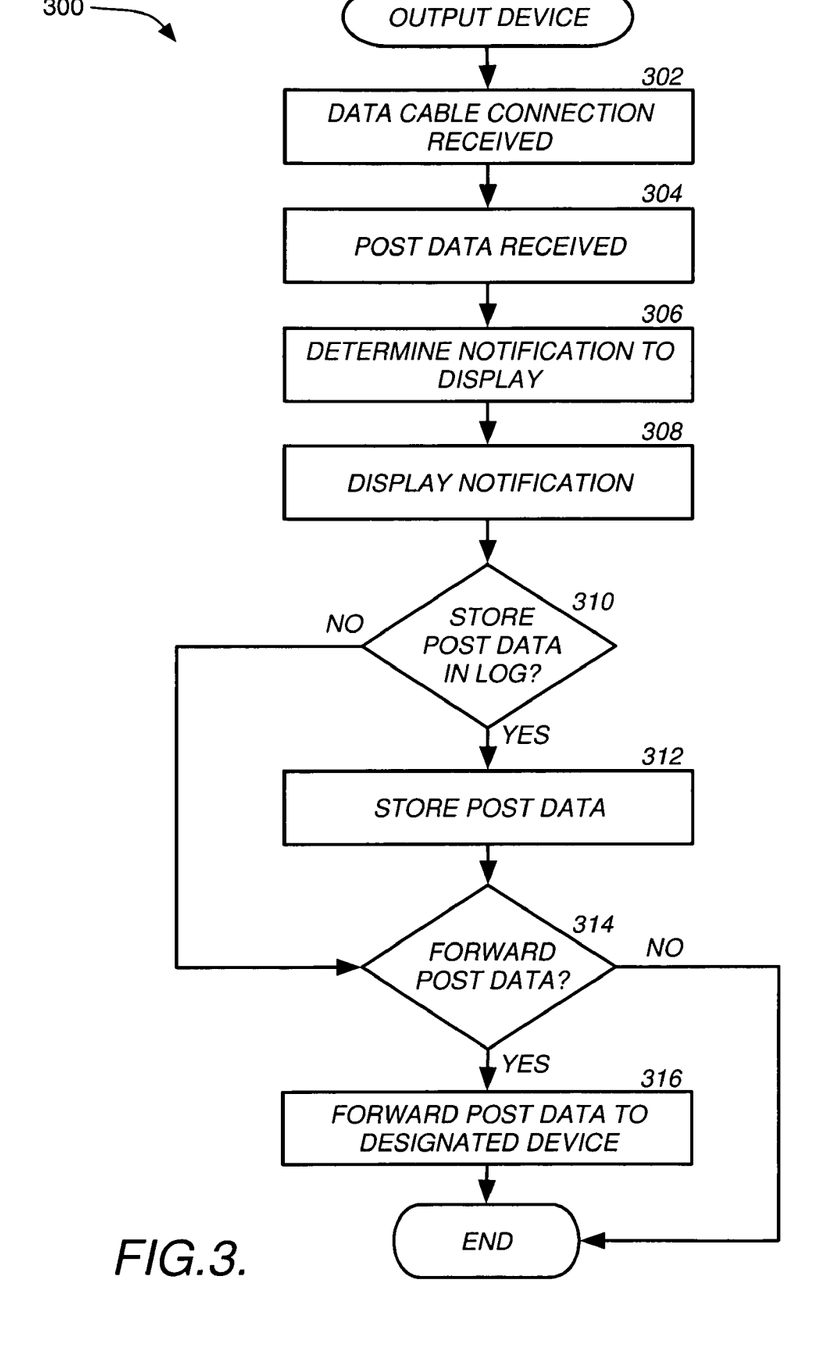
FIG. 3 is a flow diagram showing aspects of the operation of an output device according to embodiments described herein.

FIG. 3 shows an illustrative routine 300 that shows aspects of the operation of the output device 104 for receiving POST data and providing a notification 126 to the output device 104 according to various embodiments presented herein. The routine 300 begins at operation 302, where the communications port 124 of the output device 104 receives a connector of the data cable 130. The routine continues to operation 304, where the POST data notification application 120 receives POST data from the data cable 130. From operation 304, the routine 300 continues to operation 306, where the POST data notification application 120 determines the contents and format of the notification to display. The POST data notification application 120 may be pre-programmed with a set of notification rules that define how the notification is to be displayed. For example, the POST data notification application 120 may be programmed to simply display the received POST data in the format that it is received. Consequently, according to one embodiment, the POST data notification application 120 may display a hexadecimal value on the display 118 of the output device 104 whenever a hexadecimal value is received from the data cable 130.

Alternatively, the POST data notification application 120 may be pre-programmed to perform a notification message look-up within a locally or remotely stored table. For example, upon receiving a particular code or value from the data cable 130 connected to the target computer system 102, the POST data notification application 120 may reference a table to retrieve a notification message corresponding to the received code or value.

Returning now to FIG. 3, the routine 300 continues from operation 306 to operation 308, where the POST data notification application 120 provides the appropriate notification 126 to the display 118 of the output device 104 for display. From operation 308, the routine 300 continues to operation 310, where the POST data notification application 120 determines whether the POST data is to be stored in the POST data log 122. It should be appreciated that this determination may be based on pre-programmed logic within the POST data notification application 120 that POST data should always or never be logged, based on a set of notification rules that establish any number and type of conditions under which received POST data should be stored, and/or based on a command from a technician input via a user interface of the output device 104 to store the POST data.

If the POST data notification application 120 determines that the POST data is to be kept within a log, then the routine 300 will proceed to operation 312, where the POST data notification application 120 will store the POST data within the POST data log 122 prior to the routine 300 continuing to operation 314. However, if at operation 310, the POST data notification application 120 determines that the POST data is not to be kept within a log, then the routine 300 proceeds directly to operation 314, where the POST data notification application 120 determines whether any portion of the POST data at the output device 104 is to be forwarded to a third party device. This determination may be based upon pre-programmed logic within the POST data notification application 120 that POST data should always or never be forwarded, based on a set of notification rules that establish any number and type of conditions under which received POST data should be forwarded, and/or based on a command from a technician input via a user interface of the output device 104 to forward the POST data.

It should be appreciated that each instance of POST data may be forwarded to any number of designated devices using electronic mail or other communications means according to the capabilities of the output device 104. Alternatively, the entire POST data log 122 or any portion of the POST data log 122 may be forwarded to any number of designated devices. If it is determined at operation 314 that the POST data is not to be forwarded, then the routine 300 ends. However, if it is determined at operation 314 that at least a portion of the POST data should be forwarded, then the routine 300 proceeds to operation 316, where the applicable portion of POST data or of the POST data log 122 is forwarded to the designated devices and the routine 300 ends.

Figure 4:
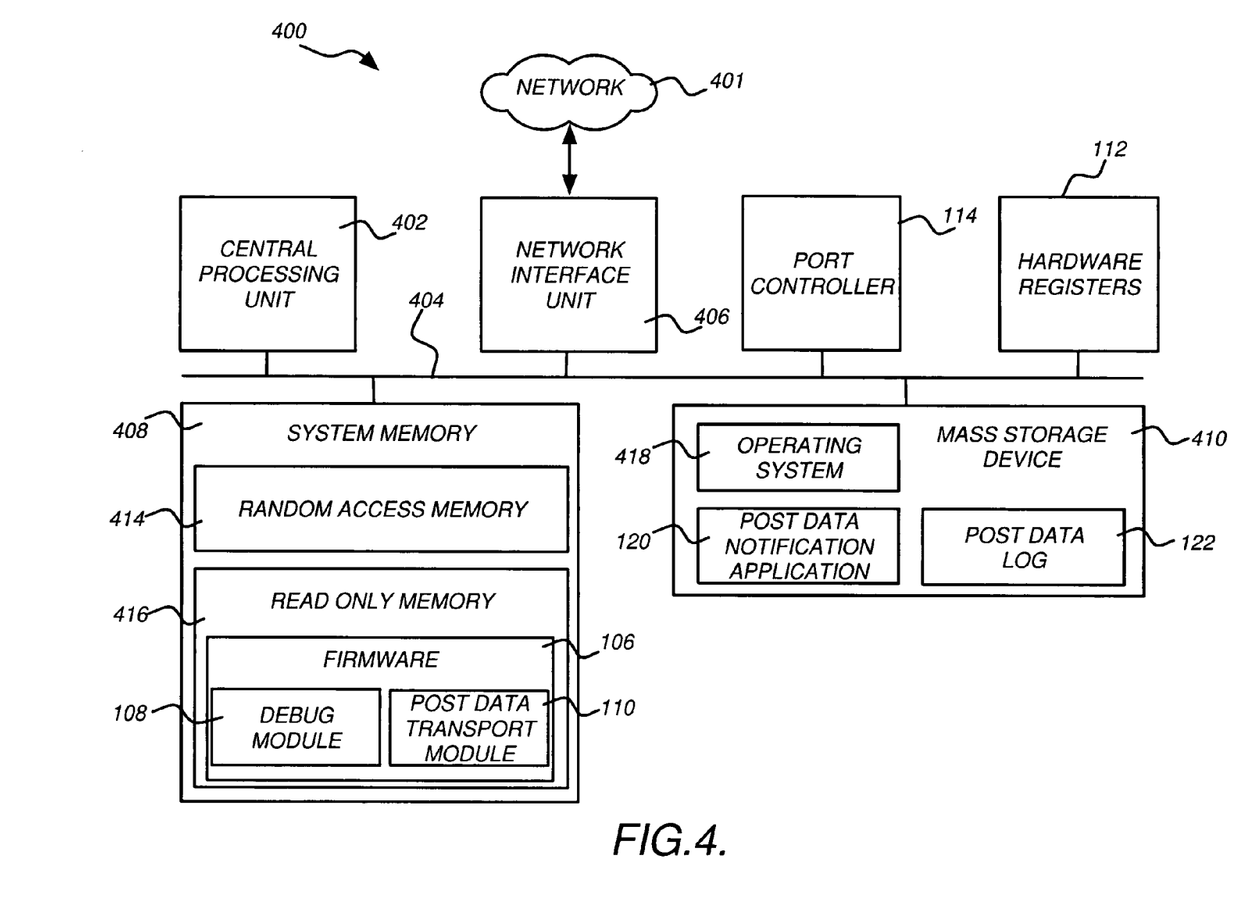
FIG. 4 is a computer architecture diagram showing a computer architecture suitable for implementing the various computer systems described herein.

Referring now to FIG. 4, an illustrative computer architecture for a computer 400 utilized in the various embodiments presented herein will be discussed. The computer architecture shown in FIG. 4 illustrates a conventional desktop, laptop computer, server computer, smart telephone, or other communications device. The computer architecture shown in FIG. 4 includes a CPU 402, a system memory 408, including a RAM 414 and a ROM 416, and a system bus 404 that couples the memory to the CPU 402. The firmware 106, which contains the debug module 108 and the POST data transport module 110, as well as other basic routines that help to transfer information between elements within the computer 400, such as during startup, is stored in the ROM 416. The computer 400 further includes a mass storage device 410 for storing an operating system 418, application programs, and other program modules, which will be described in greater detail below.

The mass storage device 410 is connected to the CPU 402 through a mass storage controller (not shown) connected to the bus 404. The mass storage device 410 and its associated computer-readable media provide non-volatile storage for the computer 400. Although the description of computer-readable media contained herein refers to a mass storage device, such as a hard disk or CD-ROM drive, it should be appreciated by those skilled in the art that computer-readable media can be any available media that can be accessed by the computer 400.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 400.

According to various embodiments, the computer 400 may operate in a networked environment using logical connections to remote computers through a network 401, such as the Internet. The computer 400 may connect to the network 401 through a network interface unit 406 connected to the bus 404. It should be appreciated that the network interface unit 406 may also be utilized to connect to other types of networks and remote computer systems. As described above, the target computer system 102 and the output device 104 communicate via a data cable 130 such as a USB 2.0 debugging cable according to various embodiments described herein. The computer 400 includes a port controller 114 for providing POST data to the data cable 130. The computer 400 may also include an input/output controller (not shown in FIG. 4) for receiving and processing input from a number of other devices, including a keyboard, mouse, or electronic stylus. Similarly, an input/output controller may provide output to a display screen, a printer, or other type of output devices (also not shown in FIG. 4).

As mentioned briefly above, a number of program modules and data files may be stored and executed by the mass storage device 410 and RAM 414 of the computer 400, including an operating system 418 suitable for controlling the operation of a networked desktop or server computer, such as the WINDOWS XP or WINDOWS VISTA operating systems from MICROSOFT CORPORATION of Redmond, Wash. Other operating systems, such as the LINUX operating system or the OSX operating system from APPLE COMPUTER, INC. may be utilized. It should be appreciated that the implementations presented herein may be embodied using a desktop or laptop computer, smart telephone or other communications device, or any other computing devices or systems or combinations thereof. The mass storage device 410 and RAM 414 may additionally store and execute one or more program modules. In particular, the mass storage device 410 and the RAM 414 may store and execute the POST data notification application 120, a POST data log 122, and any other program modules described above.

As discussed above, the embodiments disclosed herein allow for POST error codes and other data to be accessed by a technician without requiring that a PCI or other expansion card slot be available in the target computer system 102. This is valuable to a technician when the PCI bus of the target computer system 102 is not available. Additionally, the disclosure presented herein allows for more than a simple number to be provided to the technician during the POST. The amount of POST data that may be provided by the debug module 108 is limited only by the storage capacity of the hardware registers. The implementations discussed above also provide the technician with the ability to view a POST data log 122 that includes any amount of historical data stored by the output device 104 and to transmit the POST data log 122 to any other designated device.

A final example implementation will be described to illustrate a practical application of the disclosure provided herein. Using the embodiments described above, a technician may travel to a client's location with a data cable 130 and a cellular telephone as the output device 104. The technician connects the data cable 130 to the target computer system 102, launches the POST data notification application 120 on the cellular telephone and powers on the target computer system 102. The firmware 106 launches and the debug module 108 writes POST data to the hardware registers 112 via the data transport module 110. The port controller 114 sends the POST data to the data cable 130 via the target system port 116. The POST data notification application 120 within the cellular telephone receives the POST data from the data cable 130 and displays an appropriate notification 126 on the display 118 of the cellular telephone. The technician uses the notification 126 to correct any problems with the target computer system 102 or has the ability to send the notification 126 and any other historical data from the POST data log 122 to a more experienced technician for assistance.

Based on the foregoing, it should be appreciated that systems, methods, and computer-readable media for accessing POST data are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method of providing power-on self-test (POST) data associated with a POST executing on a target computer system, comprising:
   generating the POST data corresponding to a POST event;
   writing the POST data to at least one hardware register associated with a target system port configured for connection to an external output device via a universal serial bus ("USB") cable wherein the at least one hardware register provides the POST data to an external output device without using the target computer system memory;
   sending a transfer instruction to a port controller associated with the target system port to transfer the POST data within the at least one hardware register to the USB cable via the target system port,
   wherein a POST data notification application executing on the external output device connected to the target system port of the target computer system receives the POST data from the USB cable, generates a notification corresponding to the POST data, and displays the notification on a display of the external output device.

2. The method of claim 1, wherein the POST data comprises a POST error code associated with a POST failure.

3. The method of claim 1, wherein writing the POST data to at least one hardware register associated with a target system port comprises:
   sending the POST data from a debug module within a BIOS boot block to a data transport module; and
   writing the POST data to the at least one hardware register from the data transport module.

4. The method of claim 1, wherein the target system port comprises a universal serial bus (USB) 2.0 debug port and wherein the data cable comprises a USB debug cable.

5. The method of claim 1, wherein the external output device comprises a cellular telephone.

6. The method of claim 1, further comprising storing the POST data in a POST data log on the external output device.

7. The method of claim 6, further comprising transmitting at least a portion of the POST data log to a designated device.

8. A method of providing POST data associated with a POST executing on a target computer system, comprising:
   storing POST data corresponding to a POST event in at least one hardware register;
   transferring the POST data from the at least one hardware register to a target system port of the target computer system wherein the at least one hardware register provides the POST data to an external output device without using the target computer system memory;
   receiving the POST data at the external output device from the target system port via a data cable comprising a USB cable connecting the output device to the target computer system;
   generating a notification corresponding to the POST data by a POST data notification application executing on the external output device and connected to the target system port of the target computer system via the USB cable, and
   display the notification on a display of the external output device.

9. The method of claim 8, wherein the external output device comprises a cellular telephone.

10. The method of claim 9, further comprising storing the POST data in a POST data log on the cellular telephone.

11. The method of claim 9, further comprising transmitting at least a portion of the POST data log to a designated device.

12. The method of claim 8, wherein the notification comprises a hexadecimal value corresponding to a POST checkpoint.

13. The method of claim 12, wherein the notification further comprises a time stamp corresponding to an elapsed time of the POST at the POST checkpoint.

14. The method of claim 8, wherein generating the notification corresponding to the POST data comprises retrieving the notification corresponding to the POST data from a table.

15. A system for providing POST data associated with a POST executing on a target computer system, comprising:
   a POST data transport module comprising an interface for a debug module within a firmware of a target computer system, the POST data transport module operative to receive the POST data corresponding to a POST event, and
   write the POST data to at least one hardware register associated with a target system port configured for connection to an external output device via a data cable, wherein the at least one hardware register provides the POST data to an external output device without using the target computer system memory; and a POST data notification application capable of executing on an external output device connected to the target system port of the target computer system via the data cable, wherein the POST data notification application operative to receive the POST data from the data cable connecting the external output device to the target computer system, generate a notification corresponding to the POST data, and display the notification on a display of the external output device.

16. The system of claim 15, wherein the external output device comprises a cellular telephone, wherein the target system port comprises a USB 2.0 debug port, and wherein the data cable comprises a USB debug cable.

17. The system of claim 16, wherein the POST data notification application is further operative to store the POST data or notification in a POST data log on the cellular telephone, and to transmit at least a portion of the POST data log to a designated device.

* * * * *